July 14, 1942.  W. P. WILLS  2,289,947
MEASURING AND CONTROL APPARATUS
Filed June 22, 1938
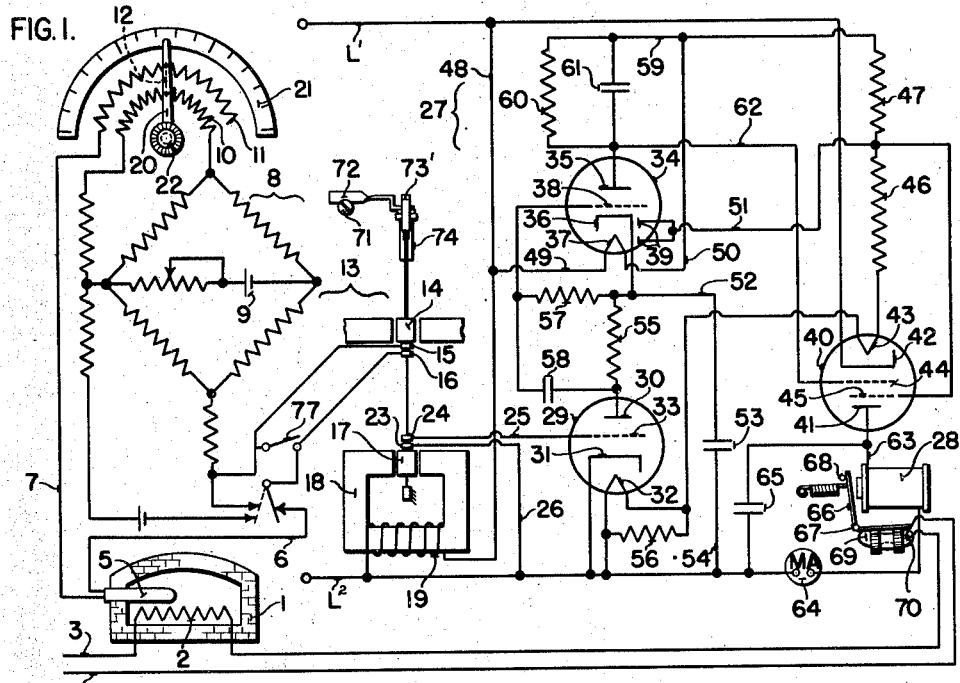
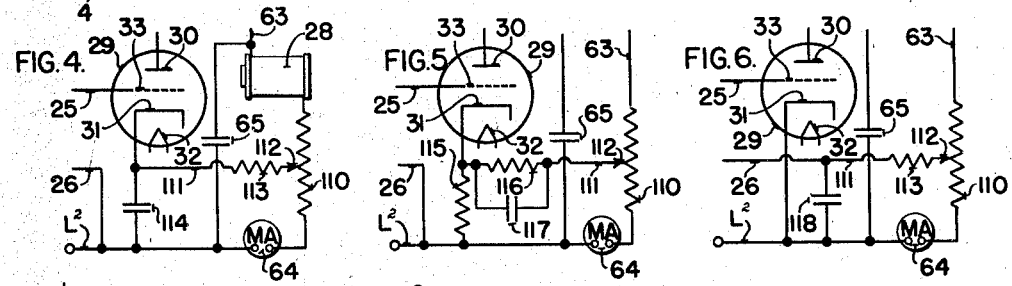
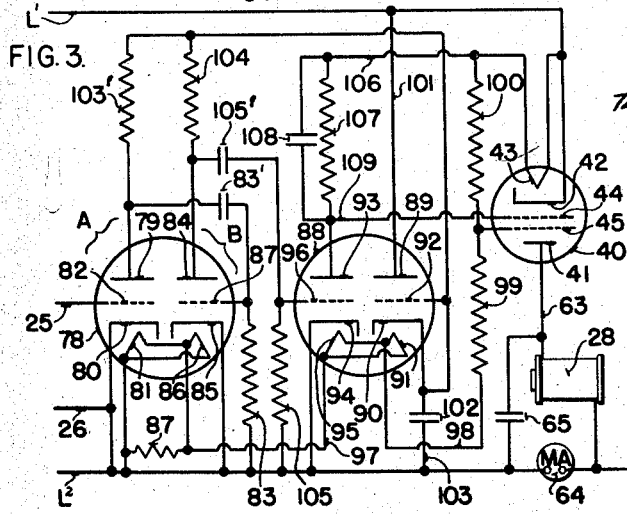
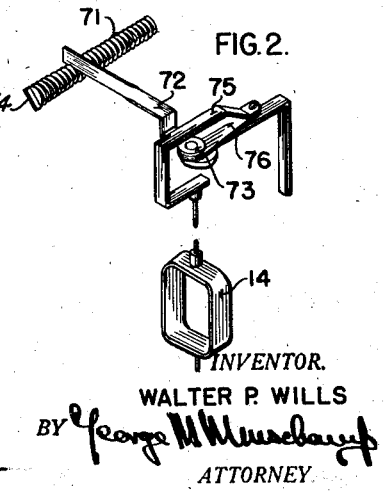
INVENTOR.
WALTER P. WILLS
BY George M. Wuschung
ATTORNEY Patented July 14, 1942

2,289,947

UNITED STATES PATENT OFFICE 2,289,947

MEASURING AND CONTROL APPARATUS

Walter P. Wills, Philadelphia, Pa., assignor to The Brown Instrument Company, Philadelphia, Pa., a corporation of Pennsylvania Application June 22, 1938, Serial No. 215,127

4 Claims. (Cl. 179—171)

This invention relates to electronic control circuits.

The present invention is a continuation in part of my prior application Serial No. 159,875, filed August 19, 1937, for Control apparatus, now Patent No. 2,256,304, September 16, 1941, which discloses various arrangements of an electrical control instrumentality of the kind which may be used to control the application of a quantity in response to fluctuations of a variable condition to maintain the condition constant.

A specific object of the present invention is to provide an electronic control circuit which is especially adapted for use in a system of the type referred to, and is relatively simple in construction and may be operated from a commercial alternating current supply source without the use of transformers and power rectifiers.

A more specific object of the present invention is to provide an electronic control circuit which is sensitively responsive to minute alternating voltages and will, amplify and translate all frequencies over a wide range of frequencies into a direct current potential which may be employed to effect a control operation.

A still more specific object of the present invention is to provide an electronic control circuit of the type referred to above in which relatively small capacity filtering means may be employed in a network for deriving from a commercial source of alternating current voltage a source of direct current voltage, which is substantially constant in value and free from ripple current effects.

The various features of novelty which characterize my invention are pointed out with particularity, in the claims annexed to and forming a part of this specification. For a better understanding of the invention, however, its advantages and specific objects obtained with its use, reference should be made to the accompanying drawing and descriptive matter in which I have illustrated and described a preferred embodiment of the invention.

Of the drawing:

Fig. 1 is a diagrammatic view illustrating one embodiment of the invention as adapted for use in controlling the temperature of a furnace;

Fig. 2 is a perspective view of a portion of the arrangement of Fig. 1 which is employed for setting the mechanical zero of the galvanometer employed in that arrangement;

Fig. 3 illustrates a modification of the amplifier shown in Fig. 1;

Fig. 4 illustrates a modification of the arrangement disclosed in Fig. 1 including means for modulating the heat input to the furnace; and Figs. 5 and 6 illustrate modifications of a portion of the arrangement of Fig. 4.

In Fig. 1 of the drawing, I have illustrated, more or less diagrammatically, a furnace or other compartment to be heated at 1 in which an electrical heating element 2 is arranged and adapted to be supplied with energizing current from supply conductors 3 and 4. A thermocouple 5, which is sensitively responsive to variations in temperature, is mounted in the furnace 1 and has its terminals connected by conductors 6 and 7 to the terminals of a deflectional potentiometric measuring network 8 at a point remote from the furnace 1.

The potentiometer network 8 may be of any suitable type such as the Brown potentiometer circuit disclosed in the Harrison Patent 1,898,124 issued February 21, 1933, and for the present purposes it is sufficient to note that the potentiometer circuit 8 includes a circuit branch comprising the thermocouple 5, an opposing circuit branch including a source of known potential, such as a battery 9 and a pair of resistors 10 and 11, a variable portion of which may be connected into the opposed branches by means of a sliding contact 12 whereby the respective effects of the variable and the known sources are made equal and opposite. Differences in the variable and known sources of potential are adapted to be detected by a galvanometer 13, the moving coil 14 of which is connected in the circuit branch including the thermocouple 5, so that when the variable and known sources of potential are equal and opposite the galvanometer moving coil will be rendered undeflected when the circuit is balanced for a predetermined value of the E. M. F. of the thermocouple with the contact 12 in a corresponding position along the slidewire resistors 10 and 11.

As illustrated the moving coil 14 of galvanometer 13 is connected in the conductor 6 by means of slip rings 15 and 16, and a pick-up coil 17 is connected to the pivot of the galvanometer moving coil. The pick-up coil 17 is positioned between the poles of a field structure 18 having a field winding 19 which is adapted to be energized from the alternating current supply lines L' and L², and is preferably, although not necessarily, so arranged that when the galvanometer is in its undeflected position the pick-up coil will be slightly in inductive relation with the alternating magnetic field set up by the field structure. The extent to which the pick-up coil 17 is in inductive relation with this alternating magnetic field and the manner in which the adjustment may be effected is described hereinafter.

For facilitating the adjustment of the instrument to control the temperature of the furnace 1 at the desired value the potentiometer sliding contact 12 may be mounted on a contact arm 20 which desirably is arranged in cooperative relation with a suitably calibrated scale 21 and is adapted to be rotated to any desired position along the scale by a knob 22.

When the temperature of the furnace 1 varies in one direction or the other from the desired value, the generated thermocouple voltage will change to a corresponding extent and as a result the thermocouple and opposed potentiometer voltages will become unequal in value and current will flow in one direction or the other through the galvanometer moving coil 14. The galvanometer moving coil thus energized will deflect in a corresponding direction and rotate the pick-up coil 17 to a new position between the poles of the field structure 18.

The alternating voltage induced in the pick-up coil 17 from the field created by the winding 19 is connected by slip rings 23 and 24 and conductors 25 and 26 to the input terminals of an electronic amplifier 27 which is employed to amplify the induced voltage and the amplified quantity is employed to control the energization of a suitable relay 28 into its open or closed position.

The amplifier 27 illustrated is especially desirable in a system where simplicity, compactness and ease of construction are essential features, for, as will be described it may be operated directly from the alternating current supply conductors L' and L² and does not require the use of power rectifiers or transformers. As shown, the conductor 25 is connected to the control grid 33 of an electronic valve 29 and the conductor 26 is connected to the cathode 31 thereof. The valve 29 is a heater type triode and includes an anode 30, the cathode 31, a heater filament 32, and the control grid 33. The heater filament 32 is adapted to receive energizing current from the alternating supply conductors L' and L² and is connected in a series circuit thereacross which includes the heater filaments 37 and 43 of a pair of electronic valves 34 and 40 and a pair of resistors 46 and 47. It is noted that this circuit in effect comprises a voltage divider from which various potentials may be tapped to supply energizing voltages to the valves 34 and 40.

The valve 34 is a heater type duplex-diode-triode and includes an anode 35, a cathode 36, the heater filament 37, a control grid 38 and a pair of diode plates 39, and the valve 40 is a tetrode preferably of the type known commercially as beam power amplifier tubes and includes an anode 41, a cathode 42, the heater filament 43, a control grid 44, and a screen grid 45.

As will become apparent the valve 34 is employed to supply direct current voltage to the anode circuit of valve 29 and also to further amplify the amplified quantity of the voltage induced in the pilot coil 17 which is impressed upon the input circuit thereof by the valve 29. Anode voltage is supplied the valve 29 through a circuit which utilizes the rectifying action of the diode plates 39 of valve 34 and which may be traced from the supply conductor L' to a conductor 48, conductor 49, heater filament 37, a conductor 50, resistor 47, a conductor 51, the diode plates 39, cathode 36, and a conductor 52 to one terminal of a condenser 53 which constitutes the positive side of a half wave rectifying unit. The condenser 53 has its negative terminal connected by a conductor 54 to the supply conductor L² and operates to smooth out ripples in the rectified current flow through the circuit including the diode plates 39 and cathode 36 which impresses a definite constant voltage across its terminals. As illustrated, the anode 30 of valve 29 is connected to the positive side of condenser 53 through a resistor 55 and the cathode 31 is connected to the negative side thereof.

In order to limit the flow of ripple current through the valve 29 to a negligible value and to permit the use of a small filtering condenser 53, the valve 29 is preferably operated with the cathode 31 virtually cold and with a relatively low voltage on the anode circuit. The temperature of the cathode 31 may conveniently be kept at a low value by shunting the heater filament with a resistor 56 so that the filament heating current will be small, and it will be apparent the potential on the anode 30 may be adjusted to a desirable value by properly proportioning resistor 46. Thus, by so adjusting the anode to cathode resistance of valve 29, it will be readily apparent that the discharge of current through the valve 29 by the condenser 53, during the half cycles when the diode plates 39 are negative, may be reduced to a negligible value and the voltage maintained on the anode 30 may be maintained at a substantially constant value. It is noted that this method of increasing the anode to cathode impedance of valve 29 is advantageous over the well known method of applying a negative bias to the control grid in that the valve may be operated over an optimum portion of its plate current grid voltage characteristic whereas such operation is not possible when the control grid is negatively biased.

When the voltage impressed on the input circuit of valve 29 is zero, that is when the pick-up coil 17 is in zero inductive relation with the magnetic field set up in the field structure 18, the valve 29 will conduct a steady flow of current of predetermined value, and accordingly a substantially constant potential drop will be maintained across the resistor 55. When the pick-up coil is deflected in one direction or the other from its neutral position, however, it is noted an alternating voltage in phase with or 180° out of phase with the line voltage will be impressed on the input circuit of valve 29, and the latter will then be alternately rendered more conductive and less conductive resulting in a pulsating direct current flow through resistor 55 and thereby in a corresponding pulsating potential drop across the latter.

The positive end of resistor 55 is connected to the cathode 36 of valve 34 and a connection is also provided between this end of resistor 55 and the control grid 38 which includes a resistor 57. As shown a condenser 58 is connected in shunt to the resistors 55 and 57 and it will be apparent that when a steady flow of current is conducted by valve 29 a charge will be stored on the condenser 58 which is equal and opposite to the potential drop across resistor 55 whereby the potential drop across resistor 57 will be zero and the control grid 38 will have the same potential as the cathode 36.

When an alternating voltage is impressed on the input circuit of valve 29, however, a pulsating potential drop will appear across the resistor 55 and accordingly the condenser 58 will alternately charge and discharge through the resistor 57 to produce a fluctuating potential drop across the latter, and it will be noted this potential drop will be impressed on the input circuit of valve 34.

Anode voltage is supplied the valve 34 directly from the alternating current supply conductors L' and L² through a circuit which may be traced from the supply conductor L', conductor 48, conductor 49, heater filament 37 of valve 34, conductor 50, a conductor 59 in which a resistor 60 is inserted, anode 35, cathode 36, and conductor 52 to the positive terminal of condenser 53. Thus, the anode circuit of valve 34 is completed through the parallel arrangement consisting of the anode circuit of the valve 29 and the condenser 53, and it is noted the magnitude of the pulsating current conducted by valve 34 is adapted to be varied in accordance with variations in the conductivity of valve 29.

In order to render negligible the effect of variations in the anode current conducted by valve 34 on the potential maintained on the anode circuit of valve 29, the current conducted by the diode section of valve 34 should preferably be made many times as large as the current conducted by the anode circuit thereof. Or in other words the diode plates 39 of valve 34 should be connected to a point on the voltage divider of such potential that the potential of the cathode 36 will be determined primarily by the current conducted in the circuit including the diode plates 39 and the cathode 36.

The obvious manner of rendering the current conducted by the diode section of the valve predominant in determining the potential of cathode 36 would be to connect the diode plates 39 directly to the supply conductor L', but it is noted that if this is done the voltage available for the anode circuit of valve 34 will be insufficient. Thus, the diode plates 39 must be connected to a point on the voltage divider of such potential that the current conducted by the diodes will be predominant in determining the potential of the cathode 36 and in addition that there will be sufficient voltage available for the anode section of the valve 34.

When a fluctuating potential is impressed on the input circuit of valve 34, this valve will be rendered less conductive or more conductive during the half cycles when the anode 35 is positive depending upon whether the voltage impressed on the input circuit thereof is in phase or displaced 180° in phase with the alternating voltage applied to the anode, and accordingly the current flow through resistor 60 will be varied to a corresponding extent. In order to smooth out the pulsating current flow through resistor 60 a condenser 61 is connected thereacross, and as will be apparent a potential drop will then be produced across resistor 60 which will gradually rise when an alternating potential in phase with the supply line voltage is impressed on the input circuit of valve 34 until a condition of equilibrium is reached and which will gradually fall to a lower value when an alternating voltage 180° out of phase with the supply line voltage is impressed on the input circuit of valve 34. Thus, a negative potential is built up on the anode 35 which is adapted to be varied as the pick-up coil 17 deflects in one direction or the other from its normally balanced position and as will become apparent this negative potential may desirably be employed to control the conductivity of valve 40.

By way of illustration it is noted that when the voltage of the supply conductors is 110 volts, the valve 29 may be of a type known commercially as a 6F5 type, the valve 34 may be a type 6Q7, the valve 40 may be a type 25L6, and correspondingly suitable values for the various circuit constants may be as follows:

| Part | Value |
| --- | --- |
| 46 | 100 ohms. |
| 47 | 175 ohms. |
| 55 | 1 megohm. |
| 56 | 50 ohms. |
| 57 | 1 megohm. |
| 60 | 1 megohm. |
| 53 | .5 microfarad. |
| 58 | .05 microfarad. |
| 61 | .05 microfarad. |

As illustrated the anode circuit of valve 40 is connected in an inverted position across the alternating supply conductors L' and L² with respect to the manner of connection of the valve 34 thereacross so that the valve 40 will be non-conductive during the half cycles when the valve 34 is conductive, and conductive when the valve 34 is nonconductive. Due to the action of condenser 61, however, the potential drop across resistor 60 will persist during the half cycles when the valve 34 is non-conductive and may, therefore, be employed to control the conductivity of valve 40 which is conductive during these half cycles. As shown the negative end of resistor 60 is connected by a conductor 62 to the control grid 44 of valve 40 and the positive end of resistor 60 is connected by means of conductors 59 and 50, the heater filament 37 of valve 34, and conductors 49 and 48 to the cathode 42 so that the potential drop across resistor 60 will be impressed on the input circuit of valve 40.

Anode voltage is supplied the valve 40 through a circuit which may be traced from the supply conductor L², a conductor 63 in which a milliammeter 64 and the relay 28 are inserted, the anode 41, and cathode 42 to the supply conductor L'. The screen grid 45 is desirably maintained at a potential which is somewhat lower than the potential applied the anode 41 and may be connected to the point of connection of resistors 46 and 47.

Thus the valve 40 is adapted to be alternately rendered conductive and non-conductive and the amplitude of the pulsating current conducted thereby is adapted to be controlled in accordance with the direct current potential drop across resistor 60. In order to smooth out the pulsating current flow through the relay 28 and the milliammeter 64 to thereby prevent chattering of the relay and to facilitate reading of the milliammeter, a condenser 65 is preferably connected across these units.

It is noted that when the above values for the various circuit components are used and suitably matched electronic valves are employed, an automatic compensation for line voltage fluctuations is obtained whereby the current flow through relay 28 will be maintained constant even though the voltage of the supply conductors L¹ and L² should vary. Such automatic compensation may be obtained, when unmatched electronic valves are employed, by suitable adjustment of the values of the various circuit components, particularly adjustment of the resistance of resistor 60 and relay 28 and the point of connection of screen grid 45 of valve 40 along resistors 46 and 47.

In the circuit arrangement illustrated, a line voltage change tends to vary the anode current of valve 40 in much the same manner as that current is varied by deflection of pilot coil 17 from its normal position, but such change in line voltage may be precisely compensated for in a manner to be explained. This compensating action is obtained by virtue of the fact that if the line voltage should change, increase, for example, the conductivity of valve 34 will increase to produce a greater voltage drop across resistor 60, and this increase in biasing potential across the latter will exactly offset the tendency of valve 40 to conduct a larger current as a result of said line voltage increase. I have found, in practice, that when the electronic valve characteristics and the circuit constants have been suitably proportioned, the line voltage may vary as much as 20% in either direction from an intermediate normal value, for which the apparatus is designed, without resulting in significant change in the anode current conducted by valve 40.

An armature 66, which is shown pivoted at a point 67 and gravity or spring biased for rotation in a counterclockwise direction into engagement with a stop 68, is arranged in cooperative relation with the relay 28 and is adapted to be rotated in a clockwise direction into engagement with the relay core when the relay is energized. The armature 66 may be formed in the shape of a right angle and the point 67 at which it is pivoted may conveniently be at the bend. One arm is directed in an upward direction and is adapted to move between the stop 68 and the relay 28, and the other arm which is adapted to be moved about a horizontal position carries a mercury switch 69. The mercury switch 69 includes contacts 70 which are adapted to be closed when the armature 66 is in its extreme clockwise position and to be opened when the armature is in its extreme counterclockwise position as shown.

As illustrated the contacts 70 are connected in a circuit including the heating resistor 2 and the power supply conductors 3 and 4 so that when the relay 28 is energized the mercury switch 69 will be actuated into its closed position to close an energizing circuit to the resistor 2. Thus, as the temperature of the furnace 1 rises above or falls below a predetermined value at which it is desired to control the temperature, the mercury switch 69 will be actuated to its open and closed position accordingly to thereby cut off or supply more heat to the furnace.

As was mentioned hereinbefore, I contemplate two modes of operation for my control system. In accordance with one method I contemplate operation in which the pick-up coil 17 is normally slightly in inductive relation with the magnetic field set up in the field structure 18 and in which the phase of the induced voltage is not changed as the relay 28 is actuated to its open and closed position, but only the amplitude of the induced voltage is varied. By so operating my control system it is noted the effects of extraneous voltages which may be induced in the pick-up coil in the normal operating position of the latter may be minimized, and in addition the relative adjustment of the pick-up coil 17 and field structure 18 required may desirably be employed to cause positive de-energization of the relay 28 upon de-energization of the galvanometer moving coil 14, which de-energization may be caused by thermocouple failure, for example. This latter feature will be described more in detail hereinafter.

When extraneous voltages are induced in the pick-up coil in the normal operating position of the latter, and the instrument is adjusted as it would necessarily have to be adjusted to be unresponsive to the currents produced by the extraneous voltages, a "dead spot" will be introduced into the operation of the instrument. Such extraneous voltages may be due to the presence of magnetic material external to the field structure 18 which may cause distortion of the magnetic field or may be due to non-uniformity of the field structure itself. As will be readily appreciated it is extremely difficult to construct a field structure in which the magnetic field will be exactly uniform. When the magnetic field is not uniform and the pick-up coil is in a position in which the induced voltage therein should be zero, the latter may have induced therein voltages of harmonic frequencies which are unstable and may operate to energize the relay 28 into its closed position. It is noted the amplifier 27 does not distinguish between frequencies as does the usual amplifier and will amplify and translate all frequencies over a wide range into a direct current potential which may be employed to control the conductivity of valve 40.

As will be apparent, when the pick-up coil 17 is deflected in one direction from the position in which it is in zero inductive relation with the fundamental frequency of the alternating magnetic field set up in the field structure 18, a voltage of one phase will be induced in the pick-up coil to cause actuation of the relay 28 in one direction and when the pick-up coil is deflected in the opposite direction a voltage of the opposite phase will be induced therein to cause actuation of the relay 28 in the opposite direction. If, however, transient induced voltages opposing either or both of the purposely induced voltages appear, the instrument will be prevented to the extent of the character and the magnitude of the transient voltage from effecting the desired actions of relay 28. If the transients are known and constant, the instrument may be so adjusted as to compensate for them, but in any case must be made insensitive to them. Thus a "dead spot" will be introduced into the movement of the pick-up coil and the system will be rendered insensitive to a corresponding extent.

Such a "dead spot" is undesirable, however, in a controller of the type disclosed, and I prefer to so operate the system that the phase of the purposely induced voltage in the pick-up coil does not change as the relay 28 is actuated from its open to its closed position, but only the amplitude of the induced voltage is changed. By adjusting the amplitude of the induced voltage in the pick-up coil, when the galvanometer moving coil is in its position of electrical balance, to a value equal to or greater than the transient induced voltages in the pick-up coil, it will be apparent that the transient voltages will have no effect on the operation of the system. Or in other words, when the pick-up coil is normally in inductive relationship with the fundamental frequency of the alternating magnetic field set up in the field structure 18, the effect of the transient voltages induced in the pick-up coil will be minimized and more stable operation of the instrument may be obtained.

As will be apparent, in control systems of this type it is desirable that upon a thermocouple or amplifier valve burnout, or other failure of the control apparatus, occurring when the relay 28 is in its closed position that the apparatus shall "fail safe," that is any one of the failures enumerated shall result in actuation of the relay 28 to its open position to thereby shut off the supply of heat to the furnace. Injury to the furnace and its contents which would ordinarily result before the attendant in charge would detect the failure may thus be prevented.

With the apparatus described it will be noted that burnout of any one of the heater filaments of the amplifier valves will result in de-energization of the amplifier. To guard against the objectionable possibility of injury to the furnace and its contents upon thermocouple failure the various components of the apparatus should be so adjusted that when the thermocouple circuit is open circuited, the relay 28 will be de-energized. It is noted this effect may be obtained by so adjusting the instrument that when the potentiometric network 8 is balanced the relay 28 will be de-energized. Thus, when the galvanometer moving coil is de-energized, the relay 28 will be actuated to its open position if it is not already in this position and the supply of heat to the furnace will be shut off. It is noted, however, that it is desirable in a system of this type to provide means for positively causing de-energization of the relay 28 upon thermocouple failure instead of relying solely on the normal adjustment of the system. As mentioned hereinbefore, this end may be attained in my control system by the same adjustment which is effective to minimize the effects of extraneous voltages induced in the pick-up coil 17.

For example, by adjusting the instrument so that when the temperature is at the desired value the galvanometer moving coil 14 will be slightly out of its mechanical zero position, that is, the position which the galvanometer will assume when its terminals are shorted or open circuited, it will be noted that thermocouple failure will result in movement of the galvanometer moving coil to its mechanical zero position. The pick-up coil 17 may be so adjusted with respect to the galvanometer moving coil that in normal operation when the temperature is at the controlled value it will be slightly in inductive relation with the field structure 18, the phase of the induced voltage being such that a positive potential will be impressed on the control grid 33 of valve 29 during the half cycles when the anode 35 of valve 34 is positive, and upon thermocouple burnout the resulting movement of the galvanometer moving coil into its position of mechanical zero adjustment will rotate the pick-up coil 17 into zero inductive relation with the field structure 18, or into a position in which the voltage induced therein will be of the opposite phase to thereby cause positive de-energization of the relay 28.

In accordance with the second method of operation of my control system which I contemplate, the pick-up coil is normally maintained in a position of zero inductive relation with the field structure 18 and adapted to have voltages of opposite phases induced therein as it is deflected in one direction or the other from this normal position. It will be apparent that by providing a field structure 18 especially designed and magnetically shielded the transient voltages induced in the pick-up coil 17 may be minimized and consequently the "dead spot" referred to hereinbefore may be reduced to a minimum.

Thus, with either method of operation, the sensitivity of the instrument may be so adjusted that when the galvanometer moving coil is in its position of electrical balance the flow of current through the relay 28 will be insufficient to actuate the relay to closed position, but on a slight change in temperature and consequent deflection of the galvanometer moving coil the energizing current to the relay will be increased sufficiently to actuate it to closed position.

This adjustment may conveniently be effected by the arrangement illustrated in detail in Fig. 2 which as shown includes a screw shaft 71 and an associated lever 72. One end of the lever 72 is rigid with a stud 73 which is mounted for rotation on the end of a horizontally projecting arm of a stationary bracket 74, and the other end of the lever is adapted to slide in a groove on the screw shaft 71 so that when the latter is rotated the lever 72 will be rotated about its pivot thereby rotating the stud 73. A flexible U-shaped member 75 is rigidly connected at the end of one arm to the end of a lever 76 the other end of which is rigid with the stud 73. The lever 76 extends back along the projecting arm of bracket 74 and, when the lever 72 is in a mid position along the screw shaft 71, the lever 76 will be directly above and parallel to the projecting arm of the bracket, and is adapted to be moved out of this parallel position when the screw shaft is rotated. The flexible member 75 is so arranged with respect to the lever 76 that one arm is directly above and parallel to the latter and extends beyond the stud 73, and the other arm is directly below and parallel to the lever 76. The galvanometer suspension wire is fixed to the latter arm of member 75 at a point which is on the axis of rotation of the stud so that when the screw shaft 71 is rotated the galvanometer moving coil 14 and the pilot coil 17 will be rotated with respect to their respective field structures.

It is noted this galvanometer mechanical zero adjustment for adjusting the sensitivity and helping the instrument to "fail safe" may be facilitated when the milliammeter 64 is employed in conjunction therewith for indicating when the adjustment is at the desired value. For example, by short circuiting the terminals of the galvanometer moving coil 14, as by a switch 77, the screw shaft 71 may be rotated until the anode current flow through valve 40 is a desirable value, and by providing a milliammeter of suitable value, this current flow may desirably cause deflection of its pointer half way up scale. Movement of the galvanometer and pilot coil from this mechanically fixed position will then result in the flow of more or less current through the milliammeter 64 and thereby in deflection of its pointer in one direction or the other from the mid-position. Thus, by closing the switch 77, a rapid check may be made as to the mechanical zero adjustment of the galvanometer and if the adjustment is not correct, a correct adjustment may readily be effected by rotation of the screw shaft 71. As shown, a projection may desirably be provided in one end of the latter for facilitating the rotation thereof, as for example, by a suitable key adapted to engage that projection.

As was noted the pulsating anode current conducted by valve 40 is adapted to be controlled in accordance with the magnitude of the direct current potential maintained across resistor 60 and this potential in turn is adapted to be controlled in accordance with the magnitude of the alternating voltage impressed upon the input circuit of valve 29 by the pilot coil 17. Moreover, since the resistor 60 is shunted by the condenser 61, it will become apparent that sudden changes in the alternating voltage induced in the pilot coil 17 will change only slightly the direct current potential drop across resistor 60. Thus, if the galvanometer moving coil 14 and the pilot coil 17 are deflected from their neutral position as a result of jarring or vibration, the resulting transitory voltage induced in the pilot coil 17 will produce only a slight change in the direct current potential drop across resistor 60 which will ordinarily be ineffective to actuate the relay armature 66 into its closed position. If the voltage induced in the pilot coil should persist, however, the potential drop across resistor 60 will be changed sufficiently to cause the relay armature to be actuated into its closed position, but it is noted that as soon as the vibration ceases, the galvanometer and pilot coils will return to their neutral positions and the relay armature will be permitted to assume its open position.

In Fig. 3 I have illustrated, more or less diagrammatically, a modification of the amplifier arrangement disclosed in Fig. 1 in which an additional stage of amplification is provided and in which the rectifier unit may be connected directly across the supply conductors L' and L². As illustrated the terminals of the pick-up coil 17 (not shown in this arrangement) are connected by conductors 25 and 26 to the input circuit of one triode section of an electronic valve 78 which may desirably be a twin amplifier type including two triodes in one envelope. This triode section includes an anode 79, a cathode 80, a heater filament 81, and a control grid 82 and the output circuit thereof is resistance-capacity coupled by a resistance 83 and a condenser 83' to the input circuit of the second triode section in the envelope. For convenience in describing the circuit connections, the first mentioned triode will be referred to hereinafter as the triode A and the second mentioned triode will be referred to as the triode B.

The triode B includes an anode 84, a cathode 85, a heater filament 86, and a control grid 87. Energizing current is supplied the heater filaments 81 and 86 through a circuit which includes the heater filaments 91 and 95 of a twin type amplifier valve 88, and the heater filament 43 of valve 40, and may be traced from the supply conductor L² to the heater filaments 81 and 86, a conductor 97, heater filaments 91 and 95 of valve 88, a conductor 98 in which a pair of resistors 99 and 100 are inserted, and the heater filament 43 of valve 40 to the supply conductor L'. The pairs of heater filaments 81 and 86, and 91 and 95, respectively, are illustrated as connected in parallel relation, but it will be readily apparent these pairs of heater filaments may be connected in series relation, if desired, and, as illustrated, the heater filaments 81 and 86 are shunted by a suitable resistor 87.

Direct current anode voltage is supplied both triode sections of valve 78 through a circuit which utilizes the rectifying action of the anode 89 and cathode 90 of valve 88 and which may be traced from the supply conductor L' to a conductor 101, and the anode 89 and cathode 90 of one triode section of valve 88 to one terminal of a condenser 102 which constitutes the positive side of a half wave rectifying unit. The negative terminal of condenser 102 is connected by a conductor 103 to the supply conductor L² and, as will be apparent, the condenser 102 operates to smooth out the pulsations in the rectified current flow through the circuit including the anode 89 and cathode 90 of valve 88 which impresses a definite constant voltage across its terminals.

As illustrated, the anode 79 of triode A is connected to the positive terminal of condenser 102 through a resistor 103' and the cathode 80 is connected to the negative side thereof. Similarly, the anode 84 of triode B is connected to the positive side of condenser 102 through a resistor 104 and the cathode 85 is connected to the negative terminal of the condenser. The flow of ripple current through both triode sections of valve 78 is limited to a negligibly small value by operating the valve with the cathodes 80 and 85 virtually cold, the resistor 87 shunting the heater filaments 81 and 86 being provided for this purpose.

It is noted that since individual electrically insulated cathodes are provided for each triode section of valve 88 that it is not necessary to provide means in this arrangement for rendering negligible the effect of variations in the anode current conducted by the triode section including anode 93 on the potentials maintained on the anodes 79 and 84 of valve 78, and furthermore, the full voltage of the supply conductors L' and L² may be applied to the rectifying unit including the anode 89 and cathode 90.

The output circuit of the triode B is resistance capacity coupled by a resistor 105 and a condenser 105' to the input circuit of the triode section of valve 88 which includes the anode 93. Anode voltage is supplied the latter mentioned triode section directly from the alternating current supply conductors L' and L² through a circuit which may be traced from the supply conductor L', heater filament 43 of valve 40, a conductor 106 in which a resistor 107 is inserted, anode 93, and cathode 94 to the supply conductor L². In order to smooth out the pulsating current flow through resistor 107 a condenser 108 of suitable value may desirably be connected thereacross. Thus, when an alternating potential in phase with the supply line voltage is impressed on the input circuit of this triode section, the potential drop across resistor 107 will gradually increase in value until a condition of equilibrium is reached, and when an alternating potential 180° out of phase with the supply line voltage is impressed on the input circuit of this triode, the potential drop across resistor 107 will gradually decrease in value.

Thus, a negative potential is built up on the anode 93 which is adapted to be varied as the pick-up coil 17 deflects in one direction or the other from its normally balanced position, and, as in the arrangement of Fig. 1, this negative potential is employed to control the conductivity of valve 40. Valve 40 is connected across the alternating supply conductors L' and L² in an inverted position with respect to the manner of connection of the triode section including anode 93 thereacross so that the valve 40 will be conductive during the alternate half cycles when the triode section referred to is non-conductive. As illustrated, the negative end of resistor 107 is connected by a conductor 109 to the control grid 44 of valve 40 and the positive end of resistor 107 is connected through the heater filament 43 to the cathode 42.

Anode voltage is supplied the valve 40 through a circuit which may be traced from the supply conductor L', cathode 42, anode 41, and a conductor 63, in which a relay 28 and a milliammeter 64 are inserted, to the supply conductor L². The screen grid 45 is desirably maintained at a potential which is somewhat lower than the potential applied the anode 41 and as shown may be connected to the point of connection of resistors 99 and 100.

Thus, in this arrangement, as in the arrangement of Fig. 1, the valve 40 is adapted to be alternately rendered conductive and non-conductive and the amplitude of the pulsating current conducted thereby is adapted to be controlled in accordance with the direct current potential drop across resistor 107 which corresponds to the resistor 60 of Fig. 1.

In Fig. 4, I have illustrated, more or less diagrammatically, a modification of a portion of the arrangement disclosed in Fig. 1 in which means are provided for modulating the heat input to the furnace 1, that is, supplying heat at a steady rate to the furnace when the temperature is at the desired value and proportionately varying the supply of heat thereto in accordance with the extent of deviation of the temperature from the desired value. This end is obtained in this arrangement by providing feed back means for setting up an oscillation in the amplifier whereby the relay 28 will alternately be actuated to its open and closed position when the temperature is at the desired value, and as the temperature of the furnace deviates in one sense or the other from the desired value, the period of the oscillation will be varied proportionately so that the interval during which the relay is in its closed position will be varied with respect to the interval when it will be in its open poston. Thus, when the temperature is at the desired value heat will be supplied the furnace at a predetermined rate, but as the temperature deviates in one sense or the other from this value, the rate of heat supply will be correspondingly varied. This action will be readily distinguished from the action obtained with the arrangement of Figs. 1 and 3 in which on-off action is obtained, that is, the heat supply to the furnace in the device of those figures is either entirely on or entirely off depending upon whether the temperature of the furnace is above or below the desired value.

Specifically, a resistor 110 is inserted in the conductor 63 in series relation with the relay 28 and the milliammeter 64, the negative end of resistor 110 being connected to one end of the relay 28 and the positive end being connected to the supply conductor L² through the milliammeter 64. The cathode 31 of valve 29 is connected by a conductor 111 to a contact 112 which is in engagement with and adjustable along the resistor 110. A resistor 113 is inserted in the conductor 111 and a connection is provided between the cathode 31 and the supply conductor L² which includes a condenser 114.

As will be readily apparent when the valve 40 is rendered conductive the current conducted by this valve will produce a potential drop across resistor 110, a portion of which, depending upon the adjustment of contact 112 along resistor 110, is adapted to be fed back into the input circuit of valve 29.

With this arrangement when the temperature of the furnace is at the desired value the pick-up coil 17 will be slightly in inductive relation with the field structure 18 and the sense of this inductive relation is such as to impress a positive potential on the control grid 33 of valve 29 during the half cycles when the anode 35 of valve 34 is positive. Thus, a negative potential will be impressed on the control grid 38 of valve 34 which results in a potential drop across resistor 60 of such magnitude as to permit the flow of sufficient current through valve 40 to actuate the relay 28 to its closed position.

The resulting potential drop produced across resistor 110 by the flow of current conducted by valve 40 is in the direction to impress a positive potential on the control grid 33 of valve 29, which potential is superimposed on the alternating voltage impressed thereon by the pick-up coil 17, and causes an oscillation in the anode current conducted by valve 40 of sufficient magnitude to cause the relay 28 to be intermittently actuated to its open and closed position. As the voltage impressed on the input circuit of valve 29 by the pick-up coil 17 increases in one direction or the other, the magnitude of this oscillation is varied in such manner as to cause the relay to remain in its closed position for a longer or shorter period of time with respect to the time in which it is in its open position.

For example, when the controlled temperature falls below the desired value, the voltage impressed on the input circuit of valve 29 by the pick-up coil 17 will become more and more predominant over the voltage fed back by the resistor 110 until the latter is ineffective to cause opening of the relay 28, and at intermediate values the feed back voltage will be effective to cause the relay 28 to be opened for intervals of varying duration depending upon the extent of deviation of the controlled temperature from the desired value. When the temperature is above the desired value the feed back voltage and the voltage induced by the pick-up coil will act in the same direction, that is, to cause opening of the relay 28, and in this case the feed back voltage will be rendered more and more ineffective as the energizing current to the relay 28 is reduced, but the voltage induced in the pick-up coil will be sufficient to maintain the relay in its open position. At intermediate values the effect of the voltage induced in the pick-up coil to maintain the relay continuously in open position will not be so pronounced and the relay will be actuated to its closed position for shorter and shorter intervals of time as the temperature of the furnace rises higher and higher above the control point. Thus a proportioning action is obtained which operates to supply varying quantities of heat to the furnace as the temperature deviates about the controlled value.

In Figs. 5 and 6, I have illustrated, more or less diagrammatically, modifications of a portion of the arrangement disclosed in Fig. 4 for obtaining such proportional control of the supply of heating medium to the furnace 1. As illustrated in Fig. 5 feed back means have been provided including a resistor 110 connected in the anode circuit of valve 40, a connection between the cathode 31 of valve 29 and a contact 112 engaging and adjustable along the resistor 110, and a biasing resistor 115 connected between the cathode 31 and the supply conductor L². The connection referred to between the cathode 31 and the contact 112 comprises a conductor 111 in which a resistor 116 shunted by a condenser 117 is inserted. The modification illustrated in Fig. 6 includes the resistor 110 and an associated resistor 113 and a condenser 118. As shown the cathode 31 of valve 29 is connected to the supply conductor L² and a connection is provided between the control grid 33 and resistor 110 including the pick-up coil 17 (not shown in Fig. 6), a resistor 113 and a contact 112 engaging and adjustable along the resistor 110. Condenser 118 is connected between the left end of resistor 113, as seen in Fig. 6, and the supply conductor L².

The operation of these modifications is similar to that of the Fig. 4 arrangement for causing an oscillation of the energizing current supplied relay 28 so that the latter will be intermittently actuated to its open and closed position, the duration of the period in which it is in its closed position with respect to the period in which it is in its open position being determined by the extent of deviation of the controlled temperature from the desired value.

While the modifications illustrated in Figs. 4-6 have been illustrated in connection with the amplifier arrangement disclosed in Fig. 1, it will be readily apparent to those skilled in the art that they may be adapted for use with the amplifier arrangement described in Fig. 3. For example, a resistor 110 may be inserted in the conductor 63 between the relay 28 and the milliammeter 64 of this arrangement and a portion of the voltage drop thereacross may be fed back in the manner illustrated in Figs. 4-6 into the input circuit of the triode section of valve 78 which includes the anode 79.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. Means for amplifying an alternating voltage including an alternating voltage supply source, rectifying means, an electronic valve having an anode, a cathode and a control electrode, means to apply said alternating voltage supply source between the anode and cathode of said valve through said rectifying means, means to apply said alternating voltage to be amplified between the cathode and control electrode of said valve, filtering means connected between the anode and cathode of said valve tending to maintain the anode voltage on said valve substantially constant and free from ripple tending to be produced therein by the fluctuations of said alternating voltage supply source, and auxiliary means associated with said electronic valve to minimize pulsations in the current flow between the anode and cathode of said valve tending to be produced by ripple in said anode voltage including means for substantially increasing the impedance of the circuit path between the anode and cathode of said valve while maintaining the operating range of the grid voltage-plate current characteristic, over which said electronic valve is adapted to operate, over the portion of said characteristic having the maximum slope.

2. Means for amplifying an alternating voltage including an alternating voltage supply source, rectifying means, an electronic valve having an anode, a cathode and a control electrode, means to apply said alternating voltage supply source between the anode and cathode of said valve through said rectifying means, means to apply said alternating voltage to be amplified between the cathode and control electrode of said valve, filtering means connected between the anode and cathode of said valve tending to maintain the anode voltage on said valve substantially constant and free from ripple tending to be produced therein by the fluctuations of said alternating voltage supply source, and auxiliary means associated with said electronic valve to minimize pulsations in the current flow between the anode and cathode of said valve tending to be produced by ripple in said anode voltage including means for substantially increasing the anode to cathode impedance of said valve without varying the potential of said control electrode relatively to the potential of said cathode.

3. In combination, an amplifier comprising an electronic device having an anode, a cathode and a control electrode, means for energizing said electronic device comprising a source of fluctuating direct current and filtering means connected between the anode and cathode of said device, and auxiliary means associated with said device to minimize pulsations in the current flow between the anode and cathode of said device tending to be produced by the fluctuations in said direct current source including means to increase the impedance of the circuit path between the anode and cathode of said valve while maintaining the operating range of the grid voltage plate current characteristic, over which said electronic device is adapted to operate, over the portion of said characteristic having the maximum slope.

4. In combination, an amplifier comprising an electronic device having an anode, a cathode and a control electrode, means for energizing said electronic device comprising a source of fluctuating direct current and filtering means connected between the anode and cathode of said device, and auxiliary means associated with said device to minimize pulsations in the current flow between the anode and cathode of said device tending to be produced by the fluctuations in said direct current source including means for increasing the impedance of the circuit path between the anode and cathode of said device without varying the potential of said control electrode relatively to the potential of said cathode.

WALTER P. WILLS.